United States Patent
Garbutt

[11] Patent Number: 5,879,563
[45] Date of Patent: Mar. 9, 1999

[54] USE OF MULTIPLE TREATMENT AGENTS TO REDUCE HARDNESS OF AN OILFIELD PRODUCED WATER

[75] Inventor: Charles F. Garbutt, Midland, Tex.

[73] Assignee: Marathon Oil Company, Findlay, Ohio

[21] Appl. No.: 866,429

[22] Filed: May 30, 1997

Related U.S. Application Data

[63] Continuation-in-part of Ser. No. 839,586, Apr. 15, 1997.
[51] Int. Cl.⁶ .................................................... C02F 1/58
[52] U.S. Cl. ........................................ 210/726; 210/724
[58] Field of Search ................................... 210/702, 714, 210/723, 724, 726, 737

[56] References Cited

U.S. PATENT DOCUMENTS

| | | | |
|---|---|---|---|
| 2,401,924 | 6/1946 | Goetz | 210/714 |
| 2,999,809 | 9/1961 | Eigner et al. | 210/48 |
| 3,026,261 | 3/1962 | Mayfield et al. | 210/56 |
| 3,839,199 | 10/1974 | Weiss et al. | 210/20 |
| 3,929,640 | 12/1975 | Dohnert | 210/195 |
| 3,951,806 | 4/1976 | Young | 210/197 |
| 4,018,656 | 4/1977 | Rogers et al. | 203/11 |
| 4,029,576 | 6/1977 | Shivers | 210/27 |
| 4,035,293 | 7/1977 | Benoit et al. | 210/45 |
| 4,036,749 | 7/1977 | Anderson | 210/23 |
| 4,336,232 | 6/1982 | Moritz | 423/164 |
| 4,366,066 | 12/1982 | Rogers et al. | 210/696 |
| 4,392,955 | 7/1983 | Soriente | 210/195.4 |
| 4,518,505 | 5/1985 | Lim et al. | 210/712 |
| 4,663,054 | 5/1987 | O'Connell et al. | 210/7 B |
| 4,724,085 | 2/1988 | Pohoreski | 210/713 |
| 4,839,057 | 6/1989 | White | 210/667 |
| 4,877,536 | 10/1989 | Bertness et al. | 210/712 |
| 4,969,520 | 11/1990 | Jan et al. | 166/266 |
| 5,075,007 | 12/1991 | Morper et al. | 210/604 |
| 5,340,468 | 8/1994 | Hawthorne et al. | 210/96.1 |
| 5,609,765 | 3/1997 | Bowman | 210/638 |

Primary Examiner—Peter A. Hruskoci
Attorney, Agent, or Firm—Jack L. Hummel; Jack E. Ebel

[57] ABSTRACT

A process is provided for treating a water to reduce its hardness by performing a series of sequential stages including a primary chemical reaction stage, a secondary chemical reaction stage and a scale removal stage. The primary chemical reaction stage includes the steps of adding a first hydroxide ion donor in the form of lime to an initial water having an initial hardness and reacting the first hydroxide ion donor to form a first portion of a scale and an intermediate water having an intermediate hardness substantially less than the initial hardness. The secondary chemical reaction stage includes the steps of adding a second hydroxide ion donor in the form of caustic to the intermediate water and reacting the second hydroxide ion donor to form a second portion of the scale and a product water having a product hardness substantially less than the intermediate hardness. The reduction contribution of the primary chemical reaction stage to total hardness reduction is substantially greater than the reduction contribution of the secondary chemical reaction stage. The scale removal stage includes the steps of separating the scale from the product water to form a sludge and disposing the sludge.

10 Claims, 3 Drawing Sheets

USE OF MULTIPLE TREATMENT AGENTS TO REDUCE HARDNESS OF AN OILFIELD PRODUCED WATER

This application is a continuation-in-part of copending application Ser. No. 08/839,586 filed on Apr. 15, 1997, and entitled "Water Treatment Process for Reducing the Hardness of an Oilfield Produced Water."

TECHNICAL FIELD

The present invention relates generally to water treatment, and more particularly to a process for reducing the hardness of an oilfield produced water or other hard water.

BACKGROUND OF THE INVENTION

Conventional methods for softening hard water commonly utilize lime (calcium hydroxide) as a chemical treatment additive to precipitate scale-forming ions from the hard water. The lime serves as a hydroxide ion donor, which induces the formation of insoluble precipitates, such as calcium carbonate and magnesium hydroxide. The resulting precipitates are discharged from the water to obtain a soft water product. Soda ash (sodium carbonate), may also optionally be employed with the lime to facilitate the formation of insoluble precipitates. The soda ash serves as a bicarbonate ion donor in the event there are insufficient bicarbonate ions in the feed water for effective operation of the lime. Examples of lime/soda ash treatment processes are disclosed in U.S. Pat. Nos. 3,951,806 and 3,929,640.

It has been found that effective utilization of lime in hard water treatment processes requires strict control of the amount of lime added to the hard water for optimum hardness reduction. If insufficient lime is added, the hardness of the water is inadequately reduced. If excess lime is added, the hardness of the treated water can increase because the excess lime serves as a calcium ion donor to the treated water. Additionally, introduction of excess lime into the hard water can generate an inordinate quantity of precipitates, causing a disposal problem for the resulting sludge waste product. FIG. 1 graphically demonstrates an optimal range of the amount of lime which is added to the hard water to optimize hardness reduction in the treated water. The optimal range resides between the vertical dashed lines of the graph.

Although the need to strictly control lime addition in hard water treatment processes for optimum hardness reduction is generally recognized, process optimization has been difficult to achieve in practice, primarily due to the relatively narrow optimal operating window for lime addition. U.S. Pat. No. 5,340,468 exemplifies recognition of the need to control lime addition to optimize certain hard water treatment processes and teaches a lime addition control system to achieve this objective. However, such systems are often not practical because of relatively complex operational requirements and relatively high operating and maintenance costs.

Another conventional method for softening hard water substitutes caustic (sodium hydroxide) for lime as an alternate hydroxide ion donor. U.S. Pat. No. 4,969,520 teaches such a hard water treatment process utilizing caustic. Caustic is a generally more effective treatment additive than lime because caustic does not contain calcium ions. Caustic obviates the risk of introducing additional hardness into the treated water due to the presence of excess treatment additive. As demonstrated by FIG. 2, the hardness of the treated water does not increase when the amount of caustic added to the water exceeds the amount required to achieve maximum hardness reduction depicted by the dashed vertical line. Nevertheless, U.S. Pat. No. 4,969,520 teaches that hard water treatment processes utilizing caustic have practical limitations because it is generally not cost effective to employ caustic for the reduction of hardness in water below predetermined minimum levels. Unfortunately, these predetermined minimum hardness levels may exceed the requirements of the user. As such, the present invention recognizes a need for a more cost effective process of treating water to reduce its hardness. Accordingly, it is an object of the present invention to provide an effective process for treating a hard water to reduce the hardness thereof. More particularly, it is an object of the present invention to provide an effective process for reducing the hardness of an oilfield produced water. It is another object of the present invention to provide a process for reducing the hardness of an oilfield produced water which has relatively low chemical costs. It is yet another object of the present invention to provide a process for reducing the hardness of an oilfield produced water that reduces the amount of sludge that is produced as waste. These objects and others are achieved in accordance with the invention described hereafter.

SUMMARY OF THE INVENTION

The present invention provides a process for treating a water to reduce its hardness. The process is generally applicable to the treatment of water containing scale-forming ions, such as bicarbonate or sulfate anions and alkaline earth metal cations, particularly calcium, magnesium or barium cations, which provide the water with its hardness. The water treatment process is performed in sequential stages comprising a primary chemical reaction stage, a secondary chemical reaction stage and a scale removal stage.

The primary chemical reaction stage includes the step of adding a first hydroxide ion donor to an initial water containing an initial concentration of the scale-forming ions that provide the initial water with an initial hardness. The scale-forming ions are bicarbonate anions or alkaline earth metal cations, preferably selected from the group consisting of calcium cations, magnesium cations, barium cations and mixtures thereof. The first hydroxide ion donor may also contain scale-forming ions and is preferably lime; The primary chemical reaction stage further includes the step of reacting the first hydroxide ion donor to form a first portion of a scale and an intermediate water containing an intermediate concentration of the scale-forming ions that provide the intermediate water with an intermediate hardness. The resulting scale is preferably selected from the group consisting of alkaline earth metal salts of carbonate and sulfate, alkaline earth metal silicates, magnesium hydroxide and mixtures thereof. The intermediate hardness is substantially less than the initial hardness and is preferably less than about 50 ppm.

The primary chemical reaction stage may optionally further include the steps of adding a bicarbonate ion donor to the initial or intermediate water, either simultaneously or sequentially with the first hydroxide ion donor, and reacting the bicarbonate ion donor to form additional scale. The bicarbonate ion donor is preferably soda ash.

The secondary chemical reaction stage includes the step of adding a second hydroxide ion donor to the intermediate water. The second hydroxide ion donor is substantially free of any scale-forming cations and is preferably caustic. The secondary chemical reaction stage further includes the step of reacting the second hydroxide ion donor to form a second portion of the scale and a product water containing a product concentration of the scale-forming ions that provide the product water with a product hardness. The product hardness is substantially less than the intermediate hardness and is preferably less than about 10 ppm. The difference between the initial hardness and the product hardness is expressed as total hardness reduction. The primary and secondary chemical reaction stages have a primary and a secondary reduction contribution, respectively, to the total hardness reduction of the process. The primary reduction contribution is substantially greater than the secondary reduction contribution, generally being greater than about 70% of the total hardness reduction.

The scale removal stage includes the steps of separating the scale from the product water, typically by gravity settling, to form a sludge and disposing the sludge.

The invention will be further understood from the accompanying drawings and description.

DESCRIPTION OF PREFERRED EMBODIMENTS

Figure 1:
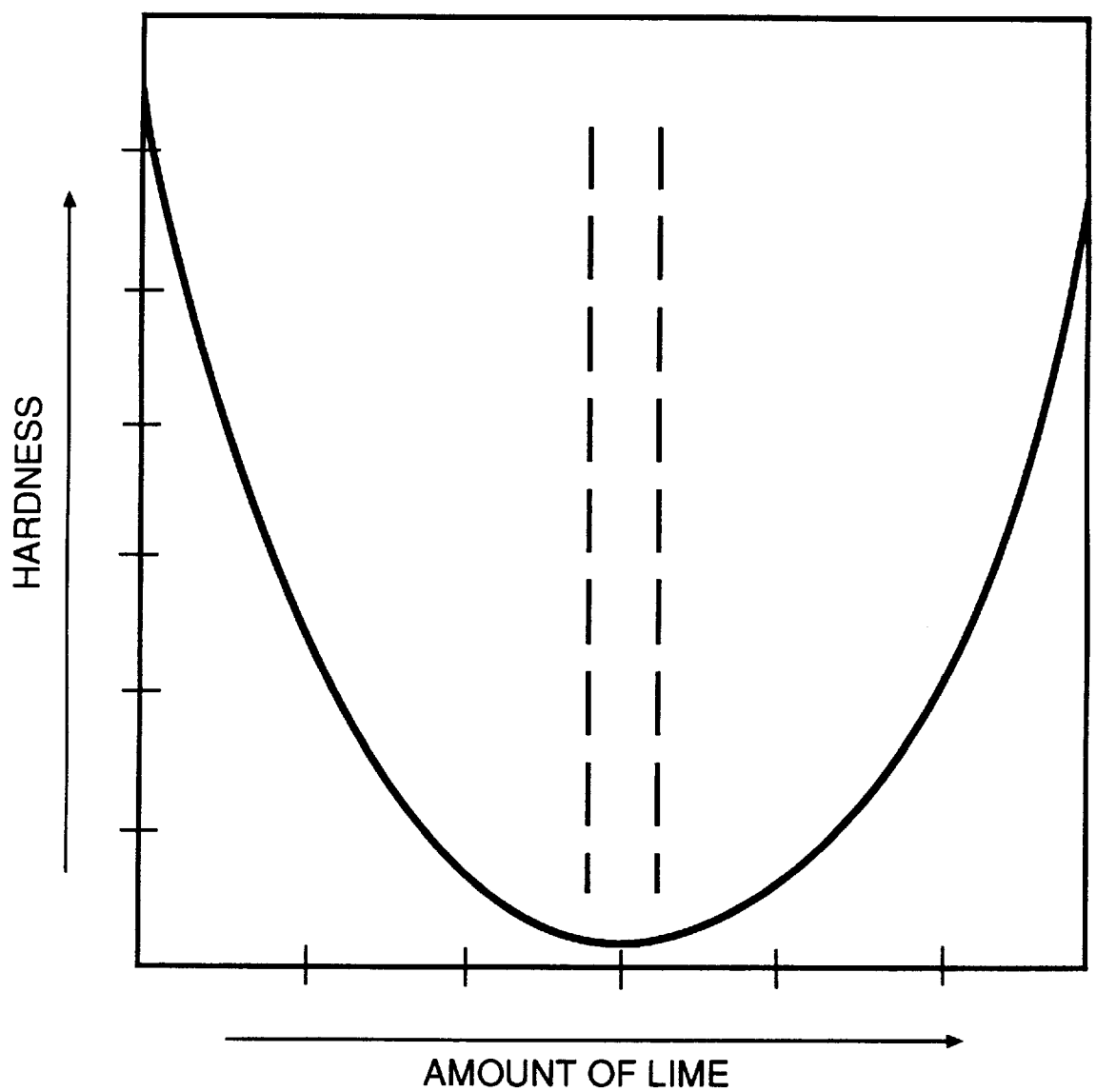
FIG. 1 is conceptual graph showing the level of hardness reduction achieved in a hard water as a function of the amount of lime added to the hard water in accordance with a prior art treatment process.

The present invention is a process for treating a water to reduce its hardness by removing scale-forming cations from the water. The process is generally applicable to the treatment of substantially any feed water containing scale-forming cations that are correlated to hardness. Scale-forming cations are defined herein as positively charged ionic species capable of producing relatively water-insoluble scale when bonded or otherwise associated with a corresponding negatively charged anion. The scale-forming cations are typically divalent metal cations, particularly alkaline earth metal cations, and more particularly calcium, magnesium or barium cations. The anions that conventionally associate with the above-recited cations to form scale are carbonates, sulfates, silicates or hydroxide anions.

Although the present water treatment process is not limited to any specific feed water, the process has been found to be effective for the treatment of an oilfield produced water, defined herein as connate water or injected water residing in a subterranean formation of an oilfield that is produced from the formation in association with the production of hydrocarbons from the oilfield. An oilfield produced water, for which the present water treatment process is particularly effective, exhibits a significant initial concentration of scale-forming cations, such as calcium, magnesium or barium cations. The oilfield produced water typically has an initial hardness in a range between about 100 and about 2,000 ppm, and preferably between about 100 and about 200 ppm, wherein hardness is expressed in terms of $CaCO_3$ concentration determined by converting the actual measured concentration of calcium and magnesium cations in the water to an equivalent calculated $CaCO_3$ concentration in a manner well known to the skilled artisan.

In addition to scale-forming cations, the oilfield produced water may exhibit a significant concentration of corresponding anions, such as bicarbonate, sulfate or silicate anions. The oilfield produced water may further include significant concentrations of other ancillary constituents. In general, the oilfield produced water has a pH in a range between about 5 and about 9, and preferably between about 6 and 8, although the present invention is not limited to a specific pH range.

In accordance with the process of the present invention, a feed water satisfying the above-described criteria, hereafter termed the initial water, is fed to a treatment vessel. A primary chemical reaction stage is initiated in the treatment vessel by adding a first hydroxide ion donor to the initial water, thereby forming a primary chemical reaction mixture. The initial water is characterized as having an initial concentration of the scale-forming ions and a corresponding initial hardness in a range between about 100 and about 2,000 ppm, and preferably between about 100 and about 200 ppm, as noted above. The preferred first hydroxide ion donor is lime, which contains scale-forming calcium cations. The first hydroxide ion donor is preferably introduced into the treatment vessel in a slightly substoichiometric amount relative to the amount of scale-forming constituents in the initial water, thereby avoiding a stoichiometric excess of the first hydroxide ion donor in the primary chemical reaction mixture. As demonstrated by FIG. 3, there are insufficient hydroxide anions available in the primary chemical reaction mixture to enable the scale-forming chemical reactions to proceed to completion during the primary chemical reaction stage.

The primary chemical reaction stage proceeds by reacting the first hydroxide ion donor in the initial water. The primary chemical reaction mixture reacts substantially instantaneously upon contact of the first hydroxide ion donor with the initial water, thereby reacting the first hydroxide ion donor substantially to exhaustion. The reaction produces a primary reaction product mixture, including a first portion of a scale and an intermediate water. The intermediate water is characterized as having an intermediate concentration of scale-forming ions, which remain from the initial water and are not consumed in the primary chemical reaction stage. The intermediate water is further characterized as having a corresponding intermediate hardness, which is substantially less than the initial hardness and is preferably less than about 50 ppm. The resulting first portion of scale is typically characterized as a mixture of some or all of the following compounds; alkaline earth metal salts of carbonate and sulfate, alkaline earth metal silicates, and magnesium hydroxide.

The primary chemical reaction stage may optionally further include the step of adding a bicarbonate ion donor to the treatment vessel either simultaneously or sequentially with the first hydroxide ion donor. The preferred bicarbonate ion donor is soda ash, which contains scale-forming bicarbonate anions. The bicarbonate ion donor may be introduced into the treatment vessel in a stoichiometric amount relative to the amount of scale-forming constituents in the initial water. Where the bicarbonate ion donor is added simultaneously, the bicarbonate ion donor reacts in the initial water. Where the bicarbonate ion donor is added sequentially with the first hydroxide ion donor, the bicarbonate ion donor reacts in the intermediate water. In any case, the bicarbonate ion donor reacts substantially instantaneously upon contact with the initial or intermediate water, thereby contributing additional scale to the first portion of scale in the primary reaction product mixture. It is noted that the bicarbonate ion donor is optional in the primary chemical reaction stage to the extent the initial water may already have an innate concentration of a bicarbonate ion donor. The innate concentration renders sufficient bicarbonate anions available in the initial water to enable the scale-forming chemical reactions to proceed substantially to completion without the addition of a bicarbonate ion donor.

The secondary chemical reaction stage is preferably initiated upon exhaustion of the limiting reactant or reactants in the primary chemical reaction stage, which is preferably the first hydroxide ion donor. The secondary chemical reaction stage is initiated by adding a second hydroxide ion donor to the primary reaction product mixture in the treatment vessel, thereby forming a secondary chemical reaction mixture, including the intermediate water and the second hydroxide ion donor. The preferred secondary hydroxide ion donor is caustic, which is substantially free of any scale-forming cations. The second hydroxide ion donor is preferably introduced into the treatment vessel in a stoichiometric amount corresponding to the dashed vertical line of FIG. 3, or a slightly stoichiometric excess immediately to the right of the dashed line, relative to the amount of scale-forming constituents remaining in the intermediate water, thereby enabling the bulk of the remaining scale-forming constituents to react to completion. As demonstrated by FIG. 3, there are sufficient hydroxide anions available in the secondary chemical reaction mixture to enable the scale-forming chemical reactions to proceed to completion during the secondary chemical reaction stage.

The secondary chemical reaction stage proceeds by reacting the second hydroxide ion donor in the intermediate water. The secondary chemical reaction mixture reacts substantially instantaneously upon contact of the second hydroxide ion donor with the intermediate water, thereby reacting the bulk of the remaining scale-forming ions in the intermediate water. The reaction produces a secondary reaction product mixture, including a second portion of the scale and a product water. The product water is characterized as having a product concentration of scale-forming ions, which remain from the intermediate water and are not consumed in the secondary chemical reaction stage. The product water is further characterized as having a corresponding product hardness, which is substantially less than the intermediate hardness. The product hardness is preferably in a range between about 2 and about 50 ppm, preferably between about 2 and about 25 ppm, and most preferably less than 10. The resulting second portion of scale is characterized in substantially the same manner as the first portion of scale.

The difference between the initial hardness and the product hardness is expressed as total hardness reduction. The primary chemical reaction stage has a primary reduction contribution, which is attributable to the addition of lime, and the secondary chemical reaction stage has a secondary reduction contribution, which is attributable to the addition of caustic. The sum of the primary and secondary reduction contributions is the total hardness reduction of the process. In a preferred embodiment of the present invention, the primary reduction contribution is substantially greater than the secondary reduction contribution. The primary reduction contribution is preferably greater than about 70% of the total hardness reduction, and more preferably greater than about 90% of the total hardness reduction.

The scale removal stage is the next stage of the water treatment process. The scale removal stage includes the step of separating substantially all or most of the scale produced by the scale-forming chemical reactions from the product water, typically by gravity settling the scale out of the product water in a sludge settler, which may be integral with the treatment vessel. It is noted that other ancillary dissolved solids present in the initial water may also be precipitated from the product water in the manner of the scale. The settled scale and any other solids form a sludge, which is accumulated in the bottom of the sludge settler. The sludge is withdrawn from the sludge settler and may be conveyed to a thickener for further processing and disposal or other alternate uses as desired. The product water is likewise removed from the treatment vessel and may be further filtered to remove any residual solids, including scale, entrained therein. The resulting product water is suitable for its intended use.

The water treatment process of the present invention is preferably practiced in a temperature range from ambient atmospheric temperature up to about 140° C. and a pressure range from ambient atmospheric pressure up to about 35 kPa. As is apparent to the skilled artisan, the water treatment process can be practiced as either a continuous or batch process within the scope of the present invention. As is further apparent to the skilled artisan, the primary and secondary chemical reaction stages of the present water treatment process can be integrated with a preceding thermal reaction stage in accordance with the teaching of my copending parent application Ser. No. 08/839,586 filed on Apr. 15, 1997, "Water Treatment Process for Reducing the Hardness of an Oilfield Produced Water," which is incorporated herein by reference.

The present invention is not limited to a specific mechanism of operation. Nevertheless, it is believed that the reduction of water hardness is achieved in accordance with the process of the present invention by contacting the scale-forming ions intrinsic to the water with the hydroxide ions introduced into the water by the first and second hydroxide donors. The scale-forming chemical reactions of the primary and secondary chemical reaction stages may be succinctly stated as follows:

$$Ca(HCO_3)_2 + 2NaOH \rightarrow CaCO_3\downarrow + Na_2CO_3 + 2H_2O \quad (1)$$

$$Mg(HCO_3)_2 + 4NaOH \rightarrow Mg(OH)_2\downarrow + Na_2CO_3 + 2H_2O \quad (2)$$

The principle feature of the scale-forming chemical reactions is the conversion of soluble calcium bicarbonate to carbonate anions. A portion of the carbonate anions combine with calcium cations to precipitate as insoluble calcium carbonate. Another portion of the carbonate anions dissociate, providing hydroxide anions that combine with magnesium cations to precipitate as insoluble magnesium hydroxide.

Figure 3:
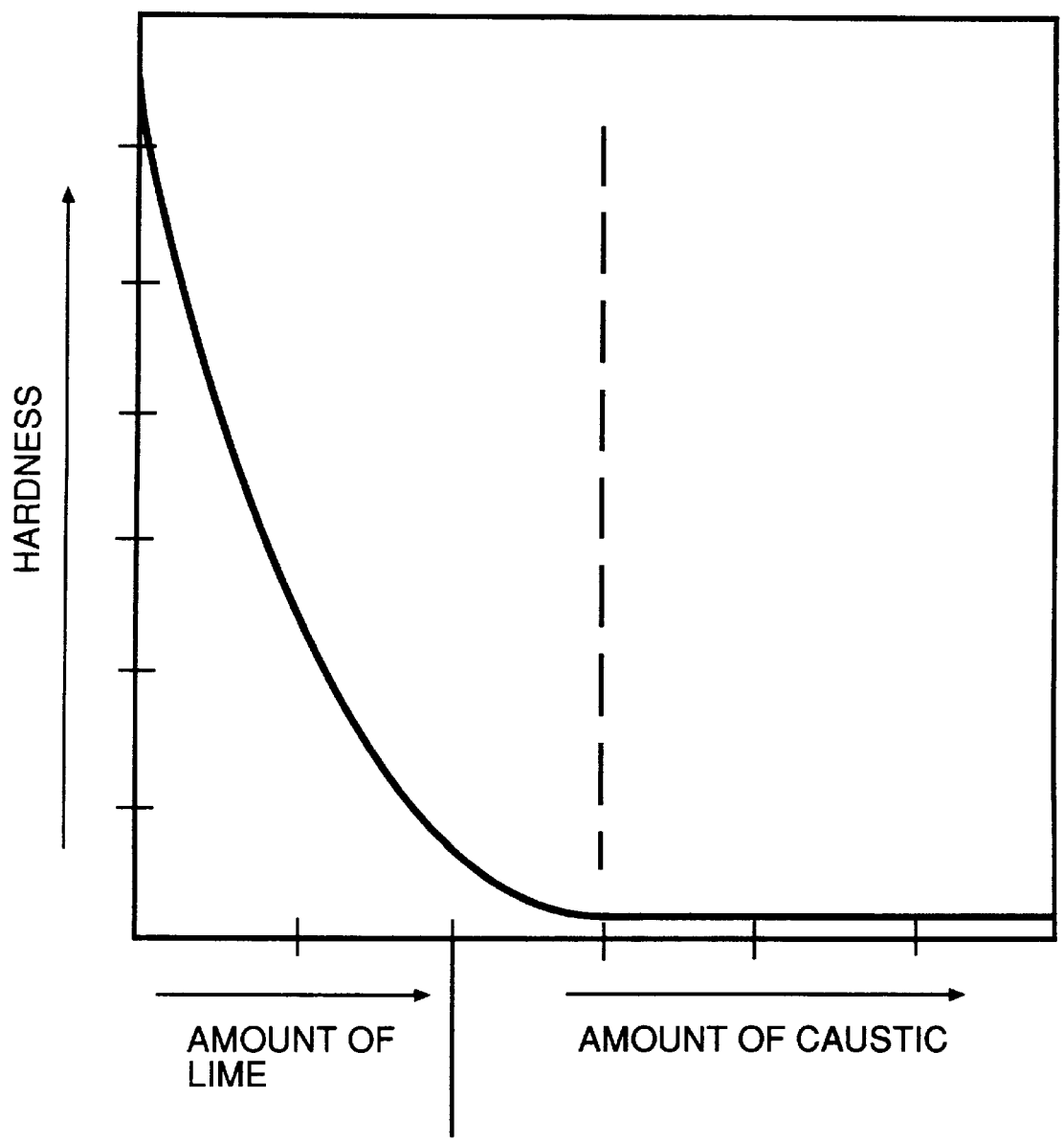
FIG. 3 is conceptual graph showing the level of hardness reduction achieved in a hard water as a function of the amount of lime and caustic sequentially added to the hard water in accordance with the treatment process of the present invention.

By performing the scale-forming chemical reactions in two stages as demonstrated by FIG. 3, substantial savings in chemical costs are realized without diminishing the hardness-reducing effectiveness of the water treatment process. The majority of the total hardness reduction is achieved during the primary chemical reaction stage using relatively low-cost lime. Accordingly, the amount of relatively high-cost caustic required to achieve the total hardness reduction is substantially diminished. The present water treatment process also substantially avoids significant process control equipment costs required in processes where lime is the chief treatment agent, and substantially avoids high chemical costs incurred in processes where caustic is the chief treatment agent.

The following example demonstrates the practice and utility of the present invention, but are not to be construed as limiting the scope of the invention.

EXAMPLE

An oilfield produced water is provided having a hardness of 1000 ppm. Three samples are drawn from the oilfield produced water. The first sample is treated in accordance with a conventional lime water treatment process, wherein a stoichiometric excess amount of lime is added to the sample and the resulting reaction mixture is processed in a conventional manner to precipitate the scale-forming ions therefrom. The results of this test run are shown in Table 1 below:

TABLE 1

| Hardness (ppm) | Lime Added (lb/bbl) |
| --- | --- |
| 1000 | 0.00 |
| 316 | 0.25 |
| 50 | 0.46 |
| 25 | 0.53 |
| 57 | 0.56 |
| 268 | 0.67 |

Table 1 indicates that a minimum hardness of 25 ppm is achieved when lime is added to the sample at a concentration of 0.53 pounds of lime per barrel of sample. Increasing the lime concentration by only about 6% to 0.56 pounds of lime per barrel of sample undesirably increases the hardness of the sample by over 100% to 57 ppm. Decreasing the lime concentration by about 13% to 0.46 pounds of lime per barrel of sample also increases the hardness of the sample by 100% to 50 ppm. These results are graphically depicted in FIG. 1. This test run shows the high sensitivity of the conventional lime water treatment process to the lime concentration and the narrow window of optimum lime concentration. Although the process is effective within the optimum lime concentration window, it is extremely difficult in practice to operate within this optimum concentration window under plant conditions, which results in suboptimum treatment performance.

The second sample is treated in accordance with a conventional caustic water treatment process, wherein a stoichiometric excess amount of caustic is added to the sample and the resulting reaction mixture is processed in a conventional manner to precipitate the scale-forming ions therefrom. The results of this test run are shown in Table 2 below:

TABLE 2

| Hardness (ppm) | Caustic Added (lb/bbl) |
| --- | --- |
| 1000 | 0.00 |
| 316 | 0.12 |
| 50 | 0.23 |
| 25 | 0.26 |
| 4 | 0.33 |
| 2 | 0.50 |
| 2 | 0.75 |
| 2 | 1.00 |

Figure 2:
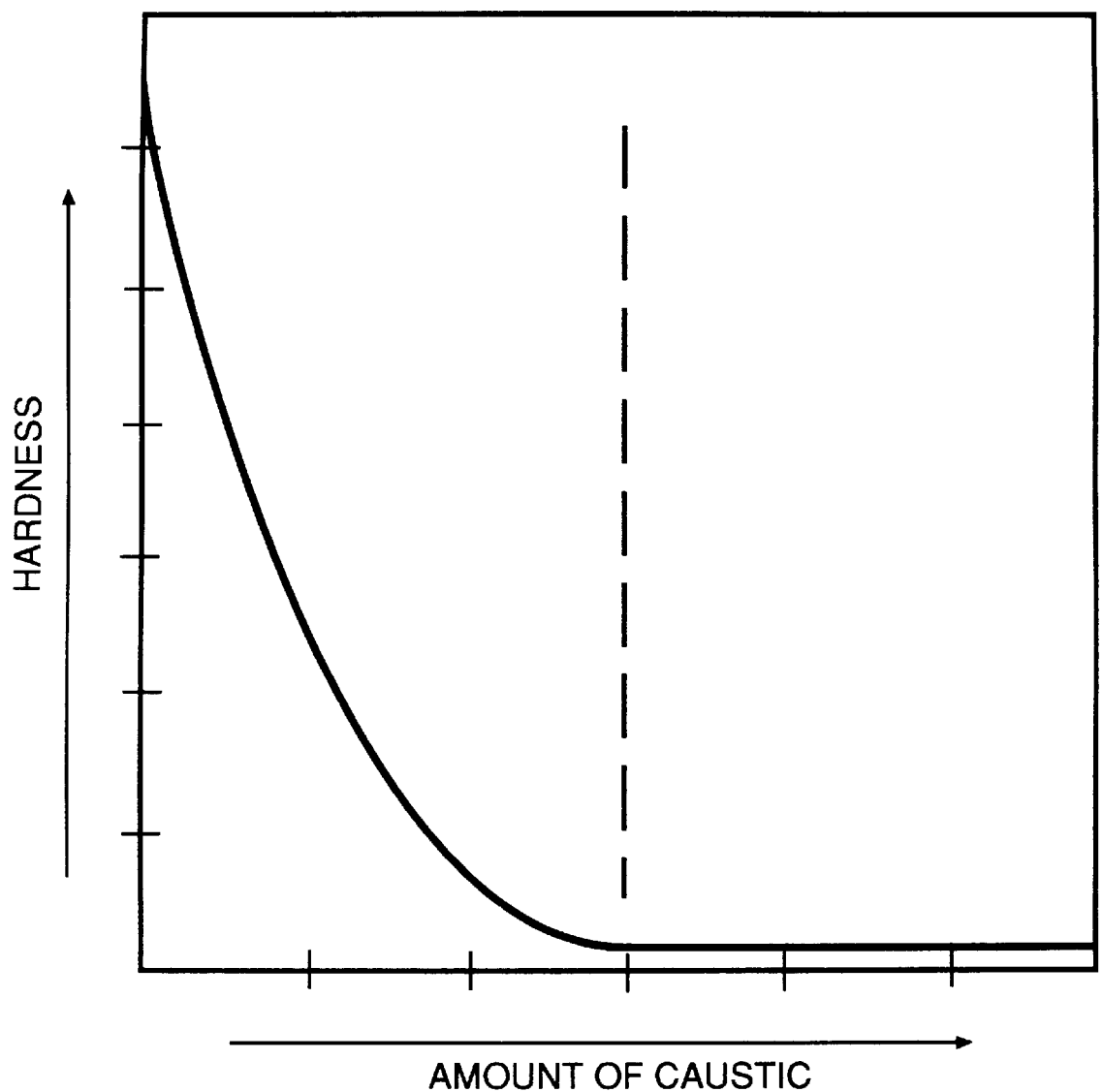
FIG. 2 is conceptual graph showing the level of hardness reduction achieved in a hard water as a function of the amount of caustic added to the hard water in accordance with a prior art treatment process.

Table 2 indicates that a minimum hardness of 2 ppm is achieved when caustic is added to the sample at a concentration of 0.50 pounds of caustic per barrel of sample. Increasing the caustic concentration neither increases nor decreases the hardness of the sample. However, decreasing the caustic concentration by about 21% from 0.33 to 0.26 pounds of caustic per barrel of sample increases the hardness of the sample by 475% from 4 ppm to 25 ppm. These results are graphically depicted in FIG. 2. This test run shows that the conventional caustic water treatment process is not highly sensitive to the caustic concentration once minimum hardness is achieved. Therefore, it is desirable to operate with a slightly stoichiometric excess amount of caustic to ensure maximum total hardness reduction. Unfortunately, the relatively high cost of caustic renders this level of operation economically impractical. Therefore the process is typically operated with a substoichiometric amount of caustic, which results in suboptimum treatment performance.

The third sample is treated in accordance with the lime/caustic water treatment process of the present invention, wherein a substoichiometric amount of lime is initially added to the sample to precipitate a first portion of the scale-forming ions therefrom. After the lime is reacted to exhaustion, a stoichiometric excess amount of caustic is added to the sample to precipitate a second portion of the scale-forming ions therefrom, constituting the bulk of the scale-forming ions remaining in the sample. The results of this test run are shown in Table 3 below:

TABLE 3

| Hardness (ppm) | Lime Added (lb/bbl) | Caustic Added (lb/bbl) |
| --- | --- | --- |
| 1000 | 0.00 | — |
| 316 | 0.25 | — |
| 50 | 0.46 | — |
| 4 | — | 0.03 |
| 2 | — | 0.10 |
| 2 | — | 0.25 |
| 2 | — | 1.00 |

The results indicate that the same degree of hardness reduction can be achieved using the present process relative to the prior art caustic treatment process at significantly less cost by substituting lime for the bulk of the caustic. These results are graphically depicted in FIG. 3. Thus, the present water treatment process avoids both the high chemical cost of the caustic treatment process and the high sensitivity of the lime treatment process.

While the foregoing preferred embodiment of the invention has been described and shown, it is understood that all alternatives and modifications, such as those suggested and others, may be made thereto and fall within the scope of the invention.

I claim:

1. A process for reducing the hardness of an oilfield produced water comprising:

a primary chemical reaction stage, including adding lime to an initial oilfield produced water containing an initial concentration of scale-forming ions that provide said initial oilfield produced water with an initial hardness, and reacting said lime to form a first portion of a scale and an intermediate water containing an intermediate concentration of said scale-forming ions that provide said intermediate water with an intermediate hardness, said intermediate hardness being substantially less than said initial hardness;

a secondary chemical reaction stage, including adding caustic to said intermediate water and reacting said caustic to form a second portion of said scale and a product water containing a product concentration of said scale-forming ions that provide said product water with a product hardness, said product hardness being substantially less than said intermediate hardness and the difference between said initial hardness and said product hardness being a total hardness reduction with said primary chemical reaction stage having a primary reduction contribution to said total hardness reduction and said secondary chemical reaction stage having a secondary reduction contribution to said total hardness reduction; and removing said first and said second portions of said scale from said product water.

2. The process of claim 1 wherein said scale-forming ions are alkaline earth metal cations.

3. The process of claim 1 wherein said scale-forming ions are selected from the group consisting of calcium cations, magnesium cations, barium cations and mixtures thereof.

4. The process of claim 1 wherein said scale-forming ions are bicarbonate anions.

5. The process of claim 1 wherein said primary reduction contribution is substantially greater than said secondary reduction contribution.

6. The process of claim 1 wherein said primary reduction contribution is greater than 50% of said total hardness reduction.

7. The process of claim 1 wherein said intermediate hardness is less than about 50 ppm.

8. The process of claim 1 wherein said product hardness is less than about 10 ppm.

9. The process of claim 1 wherein said scale is selected from the group consisting of alkaline earth metal salts of carbonate and sulfate, alkaline earth metal silicates, magnesium hydroxide and mixtures thereof.

10. The process of claim 1 wherein said primary chemical reaction stage further includes adding soda ash to said initial water or said intermediate water and reacting said soda ash to form said scale.

* * * * *